United States Patent [19]
Boehm et al.

[11] Patent Number: 5,031,971
[45] Date of Patent: Jul. 16, 1991

[54] BRAKE SYSTEM FOR AUTOMOTIVE VEHICLES AND BRAKE FORCE BOOSTER THEREFOR

[75] Inventors: Peter Boehm, Friedrichsdorf; Wilfried Wagner, Huettenberg-Weidenhauser; Lothar Schiel; Hans-Jüergen Beilfuss, both of Hofheim, all of Fed. Rep. of Germany

[73] Assignee: Alfred Teves GmbH, Frankfurt Am Main, Fed. Rep. of Germany

[21] Appl. No.: 359,888

[22] Filed: Jun. 1, 1989

[30] Foreign Application Priority Data

Jun. 1, 1988 [DE] Fed. Rep. of Germany ....... 3818708

[51] Int. Cl.$^5$ ............................................... B60T 8/44
[52] U.S. Cl. ................................. 303/114; 188/356
[58] Field of Search ............... 303/113, 114, 4, 12; 188/356; 60/581

[56] References Cited

U.S. PATENT DOCUMENTS

| | | | |
|---|---|---|---|
| 3,559,532 | 2/1971 | Mac Duff | 303/114 |
| 4,630,708 | 12/1986 | Takayama et al. | 303/114 |
| 4,653,813 | 3/1987 | Burgdorf et al. | 303/114 X |
| 4,702,531 | 10/1987 | Kircher et al. | 303/114 |
| 4,778,225 | 10/1988 | Rudolph et al. | 303/114 |
| 4,828,337 | 5/1989 | Wagner et al. | 303/114 |

FOREIGN PATENT DOCUMENTS

| | | |
|---|---|---|
| 3715839 | 11/1988 | Fed. Rep. of Germany ...... 303/114 |
| 0131356 | 7/1985 | Japan ................................. 303/114 |
| 1259629 | 3/1969 | United Kingdom . |
| 1418395 | 1/1973 | United Kingdom . |
| 2009871 | 6/1979 | United Kingdom . |
| 2036221 | 6/1980 | United Kingdom . |
| 2079881 | 1/1982 | United Kingdom . |

Primary Examiner—Matthew C. Graham
Attorney, Agent, or Firm—Robert P. Seitter; J. Gordon Lewis

[57] ABSTRACT

As an improvement on conventional brake systems of the type having a multiple-chamber vacuum brake force booster, a modification is disclosed to the effect that, in the brake releasing position, there is a pressure medium communication between a booster chamber and a simulator chamber. A modulator chamber requires only one external connection, thereby substantially simplifying the construction of the brake force booster and readily permitting an extension of the system's use to include traction slip control.

10 Claims, 2 Drawing Sheets

BRAKE SYSTEM FOR AUTOMOTIVE VEHICLES AND BRAKE FORCE BOOSTER THEREFOR

BACKGROUND OF THE INVENTION

The present invention is concerned with a brake system for use with automotive vehicles, including a vacuum brake force booster operatively located between a brake pedal and a master brake cylinder. The brake force booster comprises at least two working chambers separated from one another by a diaphragm plate, with one of the working chambers being in communication with a vacuum source via a master electro-magnetic valve, and the other working chamber being capable of being vented via a control valve actuable by the brake pedal to generate a brake force in proportion to the brake pedal force.

The inventive brake system includes wheel brake cylinders in communication with the master brake cylinder and sensors associated with the wheels for detecting the rotational behavior of the wheels and determining a locking tendency, the output signals of such sensors being applied to a central electronic controller which, in response to the sensor signals, supplies a switching signal to the master electro-magnetic valve so that the first working chamber is placed in communication with the atmosphere rather than with the vacuum source.

The brake force booster further comprises an auxiliary diaphragm plate fixed to a simulator housing and separating an additional simulator chamber from the booster chamber, the simulator chamber being in permanent communication with the vacuum source and capable of being vented. The brake force booster also includes a piston rod transmitting the brake pedal force which is supported, through a spring, on the simulator housing. The diaphragm plate for generating the brake force is freely displaceable away from the simulator housing.

The present invention further discloses a brake force booster including a front chamber capable of being vented and a rear chamber to which controlled pressure is applied, the chambers being defined by a movable wall and separated from one another by a rolling diaphragm in an air-tight manner, and the rolling diaphragm being in abutment with the side of the wall facing the control pressure chamber.

A brake system and a brake force booster of the above-described type have been taught elsewhere. Venting of the booster chamber has previously been accomplished in a manner such that, through actuation of a control valve by means of a pedal, the communication between a booster chamber and a modulator chamber is initially interrupted and, subsequently, a communication between the booster chamber and the atmosphere is established. Because the control valve is located within a simulator housing, this arrangement requires that a pressure fluid connection be provided between the modulator chamber and corresponding chambers within the control housing. This has been achieved in that the control housing is open towards the front and is sealingly passed through a partition or diaphragm plate between the modulator chamber and the booster chamber.

The above-described design involves a number of disadvantages. For example, two seals are provided for the diaphragm plate, to wit, one for sealing against the housing of the brake force booster and the other for sealing against the simulator housing.

It is, therefore, the object of the present invention to reduce the number of seals required and to thereby attain a system which is less susceptible to said failure.

SUMMARY OF THE INVENTION

This object is met by establishing a pressure medium communication between the simulator chamber and the booster chamber in the brake releasing position of the control valve.

The diaphragm plate between the modulator chamber and the booster chamber is now of a configuration having no holes therethrough, so that merely one seal for sealing against the housing of the brake force booster is required, with pressure medium communications within the brake force booster between the modulator chamber and the other chambers having been eliminated. The modulator chamber is in communication with a vacuum source or with the atmosphere through only one outer connection, depending on the type of brake force booster used.

To insure that the diaphragm plate is centered within the brake force booster, a plunger transferring the movement of the plate to the push rod piston of the master brake cylinder is firmly connected to the push rod piston. Preferably, a screw connection is provided. To avoid the transmittal of braking forces through the screw thread, a plug is provided between the plunger and the push rod piston.

The simulator housing, advantageously, comprises a cup having a floor which can be applied to the center of the diaphragm plate between the booster chamber and the modulator chamber. On its open side, the cup is closed by a lid having a hole in its center which extends into a sleeve sealingly guided through the brake force booster housing. Two chambers within the simulator housing, through transverse and longitudinal bores within the housing, can be connected to the simulator chamber and the booster chamber, respectively. The pressure medium connections can therefore be structurally established in a convenient manner. Another advantage resides in that the simulator housing is supported on the heads of the bolts connecting the brake force booster to the firewall of the automotive vehicle. The holding forces acting on the simulator housing are thus absorbed not by the brake force booster but rather by the splash shield of the automotive vehicle which, in any case, results in an easier construction of the brake force booster.

A particularly favorable characteristic of the inventive brake force booster, providing a reliable correspondence between pedal force and boosting force, is attained in that the diaphragm plate in the simulator housing is guided through a rolling diaphragm. These rolling diaphragms are very easy to handle so that the above boosting characteristic is not negatively affected by friction effects.

As already described elsewhere in the art, the modulator chamber of this type of brake system is vented for brake slip control purposes, with the result that the pressure within the modulator chamber may exceed the pressure prevailing in the booster chamber and thereby force the rolling diaphragm to balloon into the booster chamber. If the rolling diaphragm is merely placed into abutment with the diaphragm plate, it cannot be guaranteed that the rolling diaphragm will be restored to its normal position upon the release of pressure from the modulator chambers. A defective condition of this type might result in a failure of the brake force booster. It is, therefore, suggested to fix the rolling diaphragm to the external rim of the diaphragm plate; preferably, a groove is provided on the outer rim of the wall into which the rolling diaphragm is placed and held by a snap ring.

It is the tendency in the development of anti-locking control systems to attain not only brake slip control but also traction slip control. In brake systems of this type, a braking force must be caused to act on the master brake cylinder which is necessarily generated irrespective of the control valve, i.e., irrespective of the driver's activities. Basically, this suggestion is disclosed in U.S. Pat. No. 4,667,471.

In a brake system of the present invention, this goal is attained in that the simulator chamber for the traction slip control is vented. The atmospheric pressure forces an auxiliary diaphragm plate and, hence, the simulator housing against the master diaphragm plate, thereby actuating the master brake cylinder. By generating a counter-pressure in the modulator chamber, the master brake cylinder pressure can be modulated in a manner similar to that which occurs during brake slip control.

The above-described switching operation is easy to realize; however, in connection with conventional brake force boosters, it exhibits the disadvantage that the brake pedal, during such traction slip control, is reciprocated in accordance with the modulation. If the driver, during a start-up operation in which the traction slip control commences to operate, then intends to decelerate, the brake pedal might not be in its initial position resulting in an extended reaction time which is undesirable.

However, with the simulator chamber vented in accordance with the brake system of the present invention, the booster chamber is vented at the same time because there is a communication between these two chambers during non-actuation of the control valve. The simulator housing will, therefore, be left in its initial position. It is only the master diaphragm plate that is displaced by the pressure gradient between the booster chamber and the modulator chamber.

To control the pressure in the master brake cylinder it is possible either to vent the modulator chamber also or to re-connect the booster chamber to a vacuum source. Particularly rapid switching and modulation of the master brake cylinders pressure is possible if the two measures are carried out simultaneously.

If the pedal is applied, i.e. if the driver intends to effect a deceleration, it is imperative that the traction slip control be interrupted immediately. The easiest way to do so is by registering brake pedal actuation which can be done by using a micro-switch to detect a movement of the control housing of the control valve in relation to the simulator housing. The switch, preferably, is located within the simulator housing, thereby protecting it against damage.

BRIEF DESCRIPTION OF THE DRAWINGS

The principles of the invention as set out above will now be explained in greater detail in conjunction with the accompanying drawings in which.

DETAILED DESCRIPTION OF A PREFERRED EMBODIMENT

Figure 1:
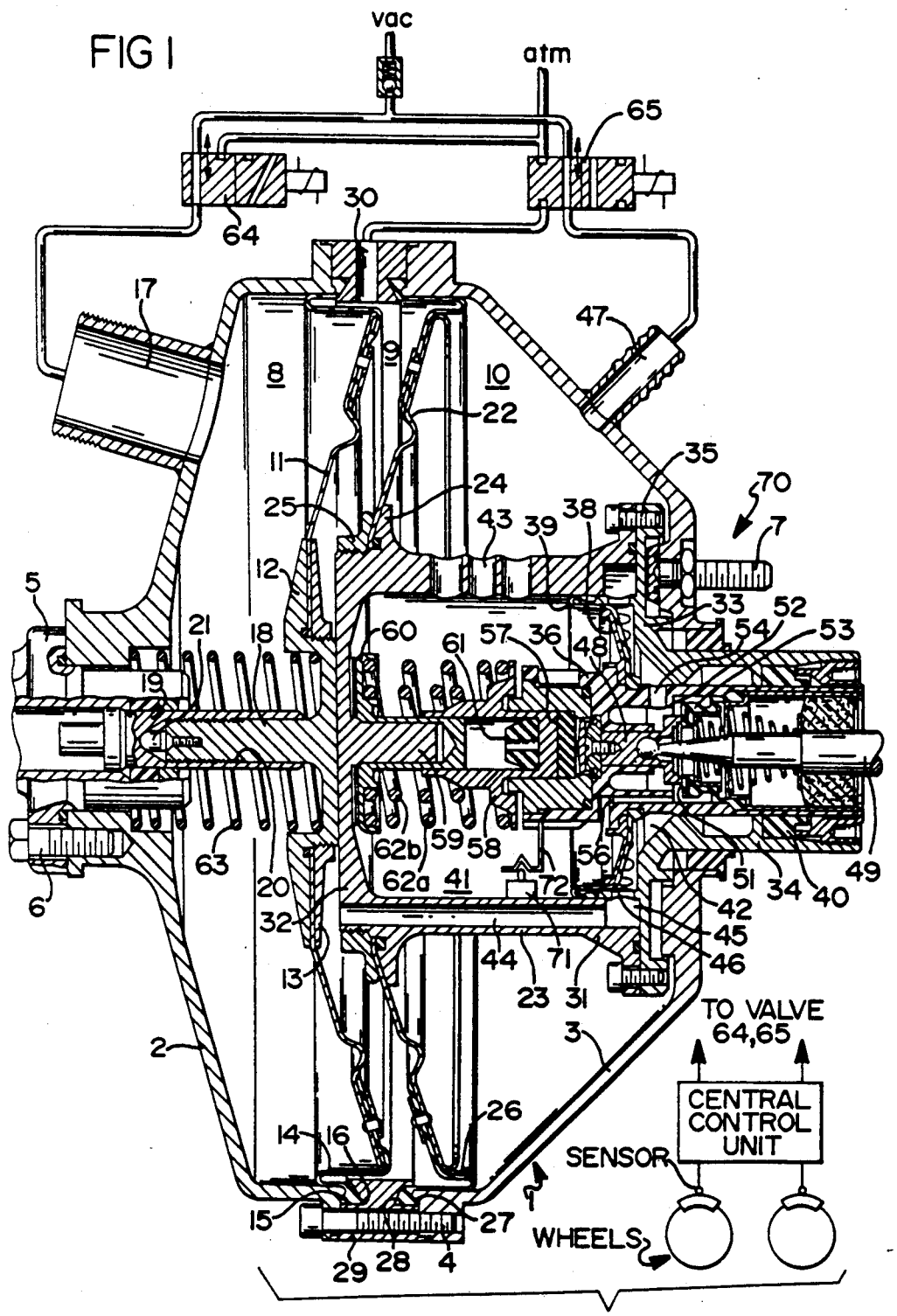
FIG. 1 is a longitudinal sectional view of a vacuum brake force booster assembly.

Reference is made to FIG. 1, which shows a vacuum brake force booster 1 constructed in accordance with the present invention. The vacuum brake force booster 1 comprises two cup-shaped housing portions 2 and 3 screwed to one another at their margins by screws 4. Attached via screw 6 to the outer wall of the front housing portion 2, coaxial with the vacuum brake force booster 1, is master cylinder 5. Guided through the wall of the rear, pedal-facing housing portion 3 are a plurality of bolts 7 with the aid of which the vacuum brake force booster can be fixed to the firewall of an automotive vehicle. Three compartments, that is, modulator chamber 8, booster chamber 9 and simulator chamber 10, are formed within the vacuum brake force booster 1.

The modulator chamber 8, in the front housing portion 2, is confined by a diaphragm plate 11. The diaphragm plate 11 is screwed to a thrust plate 12 by means of a nut 13. Fixed to the outer rim of the diaphragm plate 11 is a rolling diaphragm 14 providing an air-tight seal between the modulator chamber 8 and the other chambers of the vacuum brake force booster. The outer rim of the rolling diaphragm is held by a bead 15 in a first annular groove 16 formed in the forward face of an intermediate ring 29 disposed between the two housing portions 2 and 3.

A connecting port 17 provided in the front housing portion 2 enables the modulator chamber 8 to be vented or bled. Formed on the thrust plate 12 is a plunger 18 extending in the forward axial direction toward the master brake cylinder 5 protruding into the modulator chamber 8. In the embodiment shown, a screw connection 20 is provided whereby the plunger 18 is screwed into a threaded bore of the push rod piston 19. To eliminate the need for transmitting the braking forces through the screw thread, a plug 21 is provided on the head of the plunger which is supported on the end of the bore within the push rod piston 19. A detailed description of this communication between the plunger 18 and the push rod piston 19 will follow hereinafter in connection with the description of FIG. 2.

The space in the brake force booster 1 substantially contained within the rear housing portion 3 is subdivided into two pressure chambers by an auxiliary diaphragm plate 22. Located forward of the auxiliary diaphragm plate 22, i.e., between the diaphragm plate 11 and the auxiliary diaphragm plate 22, is a booster chamber 9. Provided between the rear housing portion 3 and the auxiliary diaphragm plate 22 is a simulator chamber 10. The auxiliary diaphragm plate is fixed to a simulator housing 23, which has an approximately cup-shaped configuration and which is coaxial with the brake force booster 1. The auxiliary diaphragm plate 22 is held by means of a nut 25 onto a circumferential flange 24 of the simulator housing 23. A rolling diaphragm 26 fixed to the outer rim of the auxiliary diaphragm plate 22 seals the modulator chamber 8 from the booster chamber 9. The outer rim of the rolling diaphragm 26 is provided with a bead 27 held in a second annular groove 28 formed in the rearward face of the intermediate ring 29. The intermediate ring 29 is held between the opposite rims of the housing portions 2 and 3 by screws 4 which, at the same time, interconnect the two housing portions 2 and 3.

In addition, the intermediate ring 29 exhibits a connecting port 30 permitting the venting or bleeding of pressure from the booster chamber 9. The simulator housing 23 is of a bipartite configuration and consists of a cup 31 open in the rearward direction, having a cup bottom 32 and a lid ring 33 sealing the cup, and exhibiting a central orifice which passes over in the rearward direction into an axially extending valve sleeve 34 arising from the lid ring 33. The valve sleeve 34 is sealingly guided through the rear wall 3 of the brake force booster 1 to the atmosphere. The cup 31 and the lid ring 33 are held together by screws 35. A control housing 36 of a control valve 70 is sealingly guided within the valve sleeve 34.

The cup 31 of the simulator housing 23 is subdivided into two chambers by means of a third diaphragm plate 38 fixed to the control housing 36 of the control valve 70, namely, the constant pressure chamber 41 between the cup bottom 32 and the third diaphragm plate 38, and the control chamber 42 located on the other side of the third diaphragm plate 38. The third diaphragm plate 38 is provided with a rolling diaphragm 39 separating the two chambers 41 and 42 in an air-tight manner. The rim of the rolling diaphragm 39 is clamped between the cup 31 and an axial extension of the lid ring 33.

Established between the constant pressure chamber 41 and the simulator chamber 10 is a permanent communication caused by transverse bores 43 in the wall of the cup 31. Moreover, there is a communication between the booster chamber 9 and the control chamber 42 through one or more longitudinal bores 44 in the wall of the cup 31. The longitudinal bores 44 terminate in an annular chamber 45 which, through a plurality of transverse bores 46 disposed in the afore-mentioned axial extension of the lid ring 33, is in communication with the control chamber 42.

The simulator chamber 10 and, hence, the constant pressure chamber 41, can be subjected to bleeding of pressure or venting through a connecting port 47 on the rear housing portion 3.

The control valve 70 for controlling the brake force boosting comprises a pedal rod 49 introduced from the outside into the control housing 36 where it is in abutment with a valve body 48. The valve body 48 is provided with a first valve seat 51, while a second valve seat 52 is located on the control housing 36. In the brake releasing position, the first valve seat 51 is in abutment with a movable valve disc 53 which, at the same time, is held in spaced relation to the second valve seat 52. Through a transverse bore 54 provided in the control housing 36 and terminating in the control chamber 42, and through a longitudinal bore 56 terminating in the constant pressure chamber 41, there is a pressure communication between the chambers 41 and 42 past the second valve seat 52. By actuating the pedal rod 49, (i.e., moving it in the forward direction) the valve body 48 is pushed further into the brake force booster, causing the valve disc 53 to approach the second valve seat 52, to abut the same, and to thereby discontinue the afore-mentioned pressure communication. In further actuating the pedal rod 49, the first valve seat 51 is lifted from the valve disc 53 which remains seated on the second valve seat 52, thereby permitting penetration of air past the pedal rod 49 along the first valve seat 51 through the transverse port 54 into the control chamber 42.

The control housing 36, through a reaction disc 57 made of rubber-type material, is supported on a sleeve 58 which, in turn, is supported on the cup floor through reaction springs 62a, 62b.

To generate a resetting force on the pedal rod 49, the valve body 48 is also supported on the reaction disc 57. For guiding the sleeve 58, a pin 59 is formed on the cup floor 32 and protrudes into the interior of the cup. A spring washer 60 on which the two springs 62a, 62b are supported is placed over the pin 59, the spring washer 60 being of cap-type configuration and protruding into a forward-opening axial bore of the sleeve 58. Located on the floor of the axial bore is a damping plug 61.

Before describing the operation of the system, a number of details will now be described.

FIG. 1 shows the brake releasing position of the vacuum brake force booster. The thrust plate 12, by means of a reset spring 63, is forced against the outer side of the cup bottom 32, thereby maintaining the simulator housing 23 in the position as shown with the lid ring 32 resting against the heads of the bolts 7 protruding into the simulator 10.

For controlling the system in case of a brake slip or traction slip control, two valves, namely one master magnetic valve 64 and one traction slip control valve 65, and one micro-switch 71 are needed. The modulator chamber 8, by way of the master magnetic valve 64, can be connected either to a vacuum source (vac) or to the atmosphere (atm). In the resting position of the valve 64, the modulator chamber 8 is in communication with the vacuum source.

The traction slip control valve 65 is a 4-way/2-position valve. In the resting position of the valve, the connecting port 30 is blocked and the connecting port 47 is in communication with the vacuum source (vac). By switching the valve 65, the connecting port 30, i.e. the booster chamber 9, is placed in communication with the atmosphere while the connecting port 47 is blocked.

A micro-switch 71 is provided in the interior of the cup and is actuated by an actuating member 72 provided on the control housing 36. The micro-switch, thereby registers a relative movement between the control housing 36 and the simulator housing 23.

Figure 2:
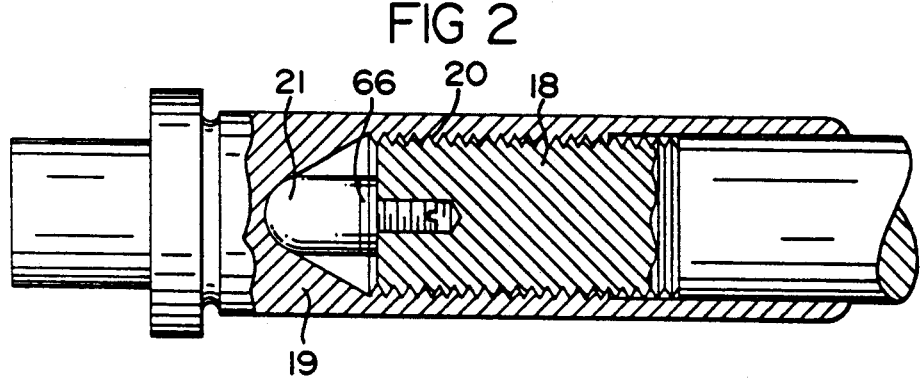
FIG. 2 is a partial sectional view showing in greater detail a thrust-transmitting connection of the embodiment of FIG. 1.

FIG. 2 shows the connection between the plunger 18 and the push rod piston 19. As previously explained, the plunger 18, by means of a screw thread 20, is screwed into a threaded bore of the push rod piston 19. The axial braking forces are transmitted by a plug 21 provided on the head of the plunger 20. Spacing washers 66 may be provided between the plug 21 and the plunger 18 so that the resting position of the brake force booster 1 can be matched to the resting position of the master brake cylinder 5.

Figure 3:
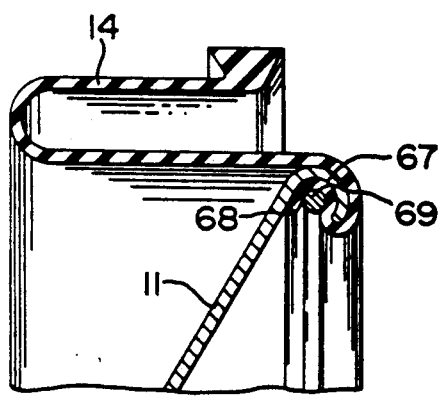
FIG. 3 is a sectional detail view of one means of attaching a rolling diaphragm to the outer rim of a diaphragm plate.
Figure 4:
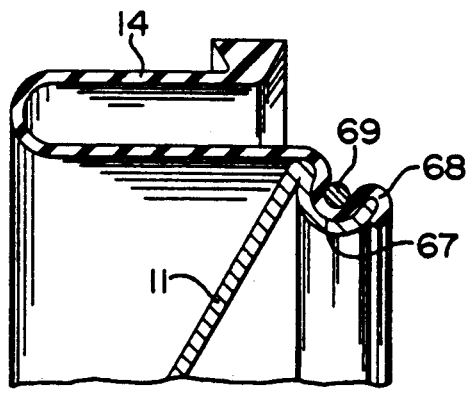
FIG. 4 is a sectional detail view of an alternative attachment means.

As will become apparent from a description of the operation of the system, a pressure exceeding the pressure prevailing in the booster chamber 9 can develop in the modulator chamber 8, with the result that the rolling diaphragm 14, normally extending in arcuate form within the modulator chamber 8, is forced past the diaphragm plate 11 into the booster chamber 9. It cannot in that case be guaranteed, upon a subsequent change in pressure, that the rolling diaphragm 14 will re-assume its normal position, especially so as the rolling diaphragm is, in general, only in loose abutment with the diaphragm plate 11 and, at best, is fixed near its axial center. It is suggested, therefore, that the rolling diaphragm be fixed to the outer rim of the diaphragm plate 11. This is accomplished in the simple manner shown in FIGS. 3 and 4, in that the plate 11, at the outer rim thereof, is provided with a circumferential groove 67. The opening of the groove 67 can extend either inwardly (FIG. 3) or outwardly (FIG. 4). In either case, the inner rim 68 of the rolling diaphragm 14 is positioned in the groove 67 and held in place by a snap ring 69.

The operation of the above-described brake system takes place in the following manner:

In the brake releasing position, all parts are in the positions shown in FIG. 1. The modulator chamber 8 and the simulator chamber 10 are in communication with a vacuum source whereas the external port 30 of the booster chamber 9 is blocked. By actuating the pedal rod 49, a dosed amount of air is admitted to the control chamber 42 which, through the longitudinal passageway 44, also is passed into the booster chamber 9. The developing pressure, on the one hand, displaces the diaphragm plate 11 towards the master cylinder 5, with the plunger 18 thereby displacing the push rod piston 19 and causing a pressure to develop in the master brake cylinder 5 which is passed on to the wheel brakes. At the same time, the pressure in the booster chamber is applied to the auxiliary diaphragm plate 22 thereby holding the simulator housing 23 in abutment with the bolts 7, i.e., in the initial position as shown. The pressure prevailing in the control chamber 42 is applied to the third diaphragm plate 38, thereby causing the control housing 36 which is connected to the plate 38 to be moved against the force of the spring 62a and, after having covered a predetermined distance, also to be moved against the force of the spring 62b.

The spring forces, through the reaction disc 57 and through the valve body 48, have a resetting effect on the pedal rod 49. Due to the forward movement of the control housing 36, at the same time, the first valve seat 51 is closed again to prevent additional air from flowing into the control chamber 42 and the booster chamber 9, respectively, with a control operation thereby taking place. The resetting force is not generated by the pressure in the master cylinder 5 but rather by the force of the springs 62a, 62b.

During a deceleration process, the rotational behavior of the wheels is continuously monitored in a known manner so that it can be immediately determined whether any one of the wheels is tending to lock. In the event of locking, the system will switch into the anti-locking mode, providing for the pressure in the master brake cylinder 5 as well as the pressure in the locking wheel brakes to be reduced. For anti-lock control, valve 64 is switched over to an activated position so that the modulator chamber 8 is in communication with the atmosphere. The pressure developing in the modulator chamber 8 will move back the diaphragm plate 11, thereby reducing the pressure in the master brake cylinder. The pressure in the booster chamber 9 continues to maintain the auxiliary diaphragm plate 22 in its resting position so that the control operation, manifested by a reciprocating movement of the partition 11, is not noted at the pedal.

The system can also be used for controlling traction slip, thereby eliminating the spinning of wheels during start-up or acceleration on slippery ground. For traction slip control, the master brake cylinder is to be actuated irrespective of the force acting on the pedal rod 49, thereby enabling the development of brake pressure to counter excessive wheel torque from the engine. In the traction slip control mode, valve 65 will be switched over to an activated position, thereby interrupting the connection to the atmosphere of the simulator chamber 10 via connecting port 47 and placing the connecting port 30 of the booster 9 into communication with the atmosphere. The air flowing into the booster chamber 9 will force the diaphragm plate 11 to the left causing pressure to build up in the master brake cylinder 5. At the same time, air flows through passageway 44 and the open valve seat 52 and the port 56, into the constant pressure chamber 41 and, hence, into the simulator chamber 10.

Hence, the same pressure will prevail on either side of the auxiliary diaphragm plate 22 so that the plate 22 will maintain its basic position. To regulate the degree traction slip control, the master valve 64 can again be switched thereby causing the development, depending on the brake pressure required in the modulator chamber 8, of a counter-pressure to the pressure in the booster chamber 9. If the driver, during a traction slip control, actuates the pedal rod 49, the control sleeve 36 will move within the simulator housing 23. The movement can be detected with the aid of a micro-switch 71. If the micro-switch 71 is activated during traction slip control, the latter will be immediately interrupted, i.e., valves 64 and 65 will be switched to their resting positions as shown in FIG. 1. The air present in the booster chamber 9 and in the simulator chamber 10 will be evacuated, thereby permitting a brake pedal-initiated deceleration.

What is claimed is:

1. A brake system for an automotive vehicle including a vacuum brake force booster operatively connected between a brake pedal and a master brake cylinder, wheel brake cylinders in communication with the master brake cylinder, sensors associated with wheels, a vacuum source, a master electromagnetic valve and a central electronic control unit, said central control unit supplying at least one switching signal to the master electromagnetic valve in response to signals received from the wheel sensors, said brake force booster comprising at least two working chambers including a modulator chamber and a booster chamber, a first diaphragm plate separating the modulator chamber from the booster chamber, a simulator chamber in communication with the vacuum source, an auxiliary diaphragm plate separating the simulator chamber from the booster chamber, a simulator housing fixed to the auxiliary diaphragm plate, a control valve operable by the brake pedal and a pedal rod absorbing the brake pedal force which is supported on the simulator housing by a spring, said modulator chamber being in selective communication with the vacuum source and the atmosphere via the master electromagnetic valve as determined by the central control unit, said booster chamber being capable of being vented from the atmosphere via the pedal-operated control valve to generate a braking force in proportion to the brake pedal force, said first diaphragm plate generating the braking force and being disposed in a manner freely displaceable away from the simulator housing, said pedal-operated control valve having a brake releasing position establishing a pressure medium connection between the simulator chamber and the booster chamber, and wherein the simulator housing comprises a cup and an annular lid having an axial extension which is guided through an exterior housing wall of the brake force booster.

2. A brake system according to claim 1, wherein the annular lid of the simulator housing comprises a lid ring having a hole therein fixed to a rim of the cup, and wherein the axial extension comprises a sleeve which encloses the hole and, is sealingly guided through the housing wall, said wall being a rear housing wall of the brake force booster.

3. A brake system according to claim 1, wherein the brake force booster additionally comprises bolts holding the brake force booster onto the firewall of the automotive vehicle, said bolts having heads upon which the simulator housing is supported.

4. A brake system according to claim 1, wherein the auxiliary diaphragm plate is fixed to a side wall of the simulator housing at the level of the cup bottom and wherein the brake force booster additionally comprises transverse bores in the wall of the simulator housing forming a pressure medium connection between the simulator chamber and the constant pressure chamber.

5. A brake system according to claim 1, wherein the brake force booster additionally comprises a constant pressure chamber and a control chamber disposed within the simulator housing, respectively, and a movable wall fixed to a control housing of the control valve which divides the two chambers, the constant pressure chamber being located between a bottom portion of the cup and one side of the movable wall and the control chamber being located on an opposite side of the movable wall.

6. A brake system according to claim 5, wherein the movable wall separating the two chambers from one another includes a rolling diaphragm.

7. A brake system according to claim 5, wherein the brake force booster additionally comprises one or more longitudinal channels provided in a side wall of the simulator housing through which the control chamber is in communication with the booster chamber.

8. A brake system for an automotive vehicle including a vacuum brake force booster operatively connected between a brake pedal and a master brake cylinder, wheel brake cylinders in communication with the master brake cylinder, sensors associated with wheels, a vacuum source, a master electromagnetic valve and a central electronic control unit, said central control unit supplying at least one switching signal to the master electromagnetic valve in response to signals received from the wheel sensors, said brake force booster comprising at least two working chambers including a modulator chamber and a booster chamber, a first diaphragm plate separating the modulator chamber from the booster chamber, a simulator chamber in communication with the vacuum source, an auxiliary diaphragm plate separating the simulator chamber from the booster chamber, a simulator housing fixed to the auxiliary diaphragm plate, a control valve operable by the brake pedal and a pedal rod absorbing the brake pedal force which is supported on the simulator housing by a spring, said modulator chamber being in selective communication with the vacuum source and the atmosphere via the master electromagnetic valve as determined by the central control unit, said booster chamber being capable of being vented from the atmosphere via the pedal-operated control valve to generate a braking force in proportion to the brake pedal force, said first diaphragm plate generating the braking force and being disposed in a manner freely displaceable away from the simulator housing, said pedal-operated control valve having a brake releasing position establishing a pressure medium connection between the simulator chamber and the booster chamber, wherein the simulator chamber is capable of being vented, and wherein the brake force booster additionally comprises an electromagnetically operated 4-way/2-position valve establishing a communication between an outer port of the simulator chamber and the vacuum source in the resting position of the valve, the outer port of the simulator chamber being blocked and an outer port of the booster chamber being connected to the atmosphere in the energized position of the valve.

9. A brake system for an automotive vehicle including a vacuum brake force booster operatively connected between a brake pedal and a master brake cylinder, wheel brake cylinders in communication with the master brake cylinder, sensors associated with wheels, a vacuum source, a master electromagnetic valve and a central electronic control unit, said central control unit supplying at least one switching signal to the master electromagnetic valve in response to signals received from the wheel sensors, said brake force booster comprising at least two working chambers including a modulator chamber and a booster chamber, a first diaphragm plate separating the modulator chamber from the booster chamber, a simulator chamber in communication with the vacuum source, an auxiliary diaphragm plate separating the simulator chamber from the booster chamber, a simulator housing fixed to the auxiliary diaphragm plate, a control valve operable by the brake pedal and a pedal rod absorbing the brake pedal force which is supported on the simulator housing by a spring, said modulator chamber being in selective communication with the vacuum source and the atmosphere via the master electromagnetic valve as determined by the central control unit, said booster chamber being capable of being vented from the atmosphere via the pedal-operated control valve to generate a braking force in proportion to the brake pedal force, said first diaphragm plate generating the braking force and being disposed in a manner freely displaceable away from the simulator housing, said pedal-operated control valve having a brake releasing position establishing a pressure medium connection between the simulator chamber and the booster chamber, wherein the simulator chamber is capable of being vented, and additionally comprising a micro-switch capable of detecting movement of the brake pedal.

10. A brake system according to claim 9, wherein the micro-switch registers movement of a housing of the control relative to the simulator housing.

* * * * *